US011614545B2

(12) United States Patent
Amor et al.

(10) Patent No.: US 11,614,545 B2
(45) Date of Patent: Mar. 28, 2023

(54) SYSTEMS AND METHODS FOR UTILIZING A CONNECTOR WITH AN EXTERNAL ANTENNA TO UTILIZE MULTIFREQUENCY GNSS FUNCTIONALITY OF A MOBILE DEVICE

(71) Applicant: NovAtel Inc., Calgary (CA)

(72) Inventors: Miguel Amor, Marietta, GA (US); Neil Gerein, Calgary (CA)

(73) Assignee: NovAtel Inc., Calgary (CA)

( * ) Notice: Subject to any disclaimer, the term of this patent is extended or adjusted under 35 U.S.C. 154(b) by 233 days.

(21) Appl. No.: 16/830,653

(22) Filed: Mar. 26, 2020

(65) Prior Publication Data

US 2021/0305680 A1    Sep. 30, 2021

(51) Int. Cl.
  *G01S 19/37* (2010.01)
  *G01S 19/14* (2010.01)
  *G01S 19/43* (2010.01)

(52) U.S. Cl.
  CPC .............. *G01S 19/37* (2013.01); *G01S 19/14* (2013.01); *G01S 19/43* (2013.01)

(58) Field of Classification Search
  CPC .. G01S 19/35–37; G06F 21/72; G06F 21/606; H01Q 1/2258; H01Q 1/2275; H01Q 1/27–34
  See application file for complete search history.

(56) References Cited

U.S. PATENT DOCUMENTS 5,379,224 A    1/1995  Brown et al.
5,420,592 A    5/1995  Johnson
(Continued)

FOREIGN PATENT DOCUMENTS

WO    WO 03081810        10/2003
WO    WO 2005045458       5/2005
(Continued)

OTHER PUBLICATIONS

Hoffmann-Wellenhof, Bernhard et. al., "GNSS—Global Navigation Satellite Systems", 2008, SpringerWienNewYork, pp. 168-169 (Year: 2008).*

(Continued)

*Primary Examiner* — Cassi J Galt
(74) *Attorney, Agent, or Firm* — Cesari and McKenna, LLP

(57) ABSTRACT

Systems and methods are provided for utilizing a connector to connect an external antenna to a mobile device. GNSS signals, associated with at least two different frequency bands, may be received at the external antenna and the GNSS signals may be transmitted to a connector module of the connector. The connector module may convert analog GNSS signals to generate digital radio frequency (RF) signals. The connector module may encrypt the digital RF signals to generate encrypted digital RF signals. The encrypted digital RF signals may be transmitted from the connector module to the mobile device. A multifrequency GNSS functionality module of the chipset may utilize decrypted digital RF signals to obtain GNSS raw measurements. The multifrequency GNSS functionality module and/or an application executing on the mobile device may utilize the GNSS raw measurements to compute position, velocity, and/or time (PVT).

21 Claims, 6 Drawing Sheets

(56) References Cited

U.S. PATENT DOCUMENTS

| | | | |
|---|---|---|---|
| 5,434,787 | A | 7/1995 | Okamoto et al. |
| 5,606,732 | A * | 2/1997 | Vignone, Sr. ........... G01S 19/37 |
| | | | 343/702 |
| 5,646,857 | A | 7/1997 | McBurney et al. |
| 5,812,086 | A | 9/1998 | Bertiger et al. |
| 6,018,784 | A | 1/2000 | Gildea et al. |
| 6,078,290 | A | 6/2000 | McBurney et al. |
| 6,560,535 | B2 | 5/2003 | Levy |
| 6,618,004 | B2 | 9/2003 | Fenton et al. |
| 6,721,657 | B2 | 4/2004 | Ford et al. |
| 6,750,816 | B1 | 6/2004 | Kunysz |
| 7,039,399 | B2 | 5/2006 | Fischer |
| 7,233,282 | B2 * | 6/2007 | Yule ...................... G06F 21/606 |
| | | | 342/357.4 |
| 7,268,727 | B2 | 9/2007 | Montgomery et al. |
| 7,671,791 | B2 | 3/2010 | Feller |
| 7,804,887 | B2 | 9/2010 | Page |
| 8,547,276 | B2 | 10/2013 | Cole et al. |
| 9,164,176 | B2 | 10/2015 | Fenton |
| 9,536,116 | B2 * | 1/2017 | Biggs ...................... G06F 13/14 |
| 10,088,576 | B2 | 10/2018 | Vasilyuk et al. |
| 10,338,231 | B2 * | 7/2019 | Wallace ................. G01S 19/32 |
| 2002/0030625 | A1 | 3/2002 | Cavallaro et al. |
| 2002/0169578 | A1 | 11/2002 | Yang |
| 2004/0236509 | A1 | 11/2004 | Jeerage |
| 2005/0242991 | A1 | 11/2005 | Montgomery et al. |
| 2008/0068262 | A1 | 3/2008 | Loomis |
| 2019/0324152 | A1 | 10/2019 | Anklovitch |
| 2019/0324154 | A1 | 10/2019 | Freestone et al. |

FOREIGN PATENT DOCUMENTS

| | | |
|---|---|---|
| WO | WO 2005/086460 | 9/2005 |
| WO | WO 2006/095368 | 9/2006 |
| WO | WO-2008139335 A1 * | 11/2008 ........... H04L 9/0631 |
| WO | WO 2017188836 | 11/2017 |

OTHER PUBLICATIONS

J. Raquet and R. K. Martin, "Non-GNSS radio frequency navigation," 2008 IEEE International Conference on Acoustics, Speech and Signal Processing, 2008, pp. 5308-5311, doi: 10.1109/ICASSP. 2008.4518858. (Year: 2008).*

European Search Report dated Sep. 19, 2019 for EP Application 19170962.5 for NovAtel, Inc., 11 pages.

Print out of NordNav R-30 Package brochure from webpage www/ navtechgps.com/pdf/r30.pdf, 2004.

"1394 Serial Bus Interface: Convergence Bus Promises to Unite PC and Digital Consumer Equipment," http://www.wdc.com/wdproducts/ library/other/2579-001014.pdf. Mar. 2000, Western Digital.

ION CNES presentation "PPP_with_external_antenna_addition_on_ smartphones" A. Blot, D. Laurichesse, C. Rouch C.N.E.S.C. Granger ALTRAN, 2019, 18 pages.

"Evaluation of a Low Cost Hand Held Unit with GNSS Raw Data Capability and Comparison with an Android Smartphone" Lachapelle et al., PLAN Group, Schulich School of Engineering, University of Calgary, Calgary, AB T2N 1N4, Canada, Nov. 29, 2018, 22 pages.

"Performance Evaluation of Smartphone GNSS Measurements With Different Antenna Configurations" Siddakatte et al., PLAN Group, Department of Geomatics Engineering, Schulich School of Engineering, University of Calgary, Calgary, Canada, Presented at Royal Institute of Navigation International Navigation Conference, Brighton, Nov. 27-30, 2017, 17 pages.

SiGe GN3S Sampler v2—GPS-08238—SparkFun Electronics, Data Sheet, Sep. 7, 2013, retrieved from the Internet Nov. 1, 2022, [https://www.sparkfun.com/products/retired/8238], 5 pages.

* cited by examiner

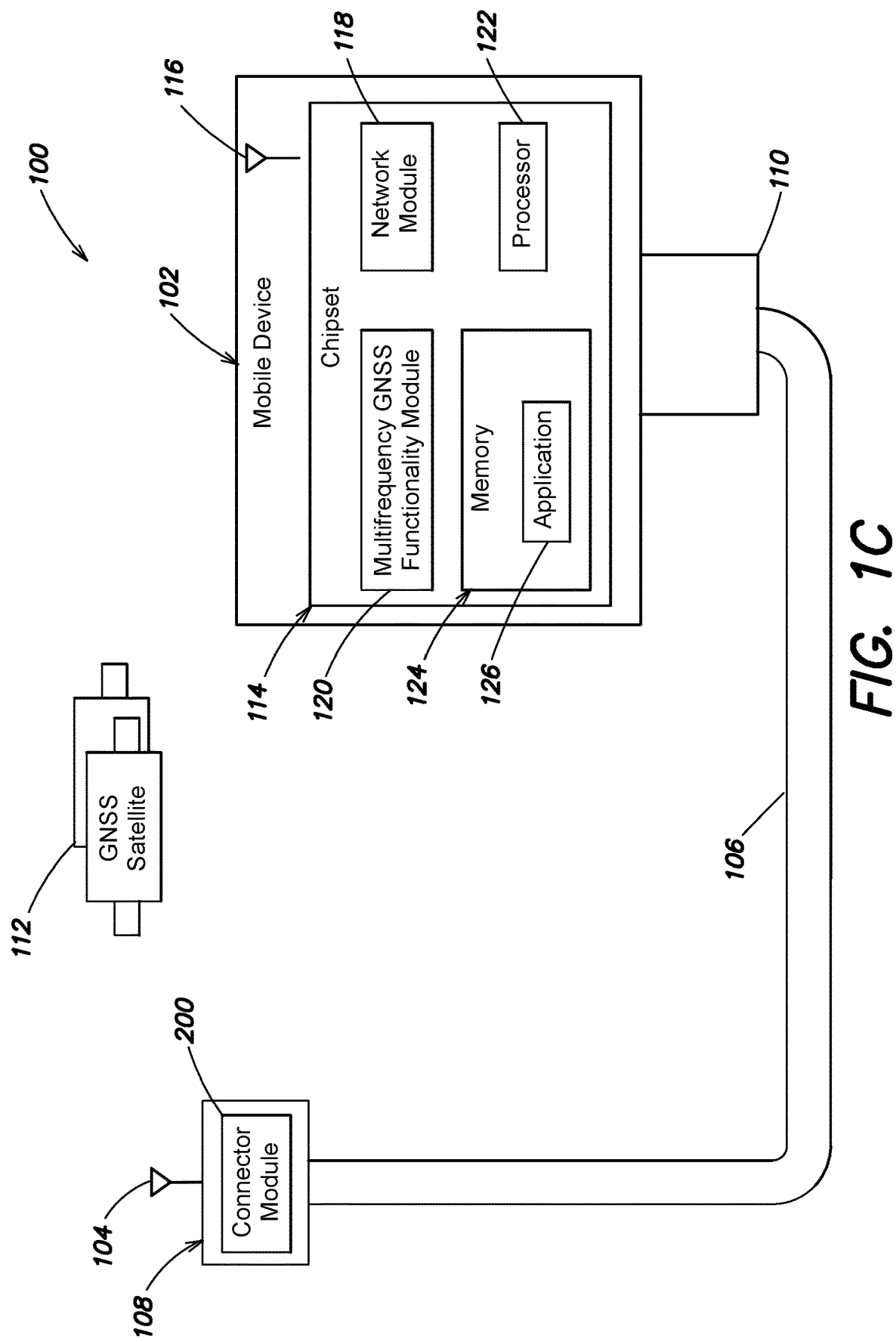

SYSTEMS AND METHODS FOR UTILIZING A CONNECTOR WITH AN EXTERNAL ANTENNA TO UTILIZE MULTIFREQUENCY GNSS FUNCTIONALITY OF A MOBILE DEVICE

BACKGROUND

Technical Field

The invention relates generally to a connector between an external antenna and a mobile device, and in particular, to systems and methods for utilizing a connector with an external antenna to utilize multifrequency Global Navigation Satellite System (GNSS) functionality of a mobile device.

Background Information

Certain mobile devices, e.g., smart phones and/or tablets, are limited in performance because the integrated GNSS antenna cannot fully take advantage of a dual frequency Global Navigation Satellite System (GNSS) chipset that is incorporated within the mobile device. The dual frequency GNSS chipset may assist in mitigating errors (e.g., multipath errors, phase center errors, and/or other errors) while computing position, velocity, and/or time (PVT) with improved (e.g., higher) accuracy as compared to the PVT that may be computed utilizing a single frequency band.

To leverage the internal dual frequency GNSS chipset, some conventional techniques may utilize a single and specific antenna that may be coupled to the mobile device where GNSS tracking functions are accomplished using a software defined radio that is executed by a processor of the mobile device. However, such conventional techniques are limited to the single and specific antenna and the software defined radio may be burdensome on the battery of the mobile device. Other conventional techniques may couple a generic antenna to the mobile device utilizing Faraday cages, i.e., re-radiator connections, or make modifications to the hardware of the mobile device to leverage the internal dual frequency GNSS chipset. However, such configurations with Faraday cages may be bulky and cumbersome, and making such hardware modifications may be tedious and time consuming.

SUMMARY

Systems and methods are provided for connecting an external antenna, e.g., Global Navigation Satellite System (GNSS) antenna, to a mobile device through use of the existing communication port of the mobile device to leverage the use of the GNSS functionality of the internal chipset of the mobile device. For example, a connector, e.g., is a cable, may be utilized to couple the external antenna to the mobile device. Specifically, a first connector component at a first end of a connector may be coupled to the external antenna and a second connector component at a second end of the connector may be coupled to the existing communication port of the mobile device.

The external antenna may receive GNSS signals from one or more GNSS satellites and the GNSS signals may be transmitted to a connector module of the connector. The connector module may be located in the first connector component, the second connector component, and/or the segment of the connector between the first connector component and the second connector component. In an embodiment, the GNSS signals received at the external antenna may be transmitted by one or more different GNSS constellations of satellites (e.g., GPS, Galileo, QZSS, BeiDou, and/or Glonass) and over at least two different frequency bands (e.g., L1, L2, L5, E1, E5, etc.).

In an embodiment, one or more filters of the connector module may perform signal processing functions on the received GNSS signals to remove unwanted signal components (e.g., noise, etc.) and generate one or more filtered GNSS signals. One or more analog/digital converters of the connector module may convert the filtered GNSS signals, in analog format, to one or more digital radio frequency (RF) signals. An encryption and control processor of the connector module may encrypt the one or more digital RF signals to generate one or more encrypted digital RF signals. The one or more encrypted digital RF signals may be transmitted from the connector module to the mobile device.

The one or more encrypted digital RF signals may be stored in a memory of a chipset of the mobile device. An application, executed by a processor of the chipset, may decrypt the one or more encrypted digital RF signals to generate one or more decrypted digital RF signals. A multifrequency GNSS functionality module of the chipset may utilize the one or more decrypted digital RF signals to obtain GNSS raw measurements that may be associated with the at least two frequency bands. In an embodiment, the multifrequency GNSS functionality module may utilize the GNSS raw measurements to compute position, velocity, and/or time (PVT) that may be higher accuracy as compared to PVT that may be computed utilizing a single frequency band. The PVT may be provided to the application for display on the mobile device or a different device coupled to and/or communicating with the mobile device.

In addition or alternatively, the application may compute PVT utilizing the GNSS raw measurements received from the multifrequency GNSS functionality module. In addition, the application may obtain encrypted correction information via a particular frequency band, e.g., L-band, or a wireless network and may decrypt and utilize the correction information to implement one or more correction services to compute PVT with higher accuracy and reduced convergence time, e.g., higher accuracy and reduced convergence time as compared to PVT that may be computed utilizing only the GNSS raw measurements that may be associated with the at least two frequency bands.

Advantageously, a variety of different and generic external antennas may be coupled to a mobile device utilizing the connector including the connector module to leverage the existing internal multifrequency GNSS functionality of the mobile device to mitigate errors (e.g., multipath, phase center errors, and other errors) such that PVT with decimeter position accuracy, for example, may be computed. As such, the one or more embodiments described herein do not require a specific type of antenna as is required by some conventional systems. Additionally, in contrast to some conventional systems, the one or more embodiments described herein do not require the execution of a software defined radio to utilize the multifrequency GNSS functionality of the mobile device, which may be burdensome on the mobile device's battery power.

Utilizing the external antenna to leverage the existing internal multifrequency GNSS functionality according to the one or more embodiments described herein also has advantages over utilizing the mobile device's internal satellite antenna. Specifically, the external antenna according to the one or more embodiments described herein is not restricted by the form factor (e.g., user design, size, etc.) of the mobile device. The form factor of the mobile device may, for example, limit the operating characteristics of the mobile device's internal satellite antenna. As such, the external antenna according to the one or more embodiments described herein may implement operating characteristics not available to and/or not implemented by the mobile device's internal satellite antenna. For example, such operating characteristics may include, but are not limited to, multipath mitigation techniques, anti-jamming techniques, etc. In addition, because the external antenna is not limited by the form factor of the mobile device, the external antenna may exhibit better performance characteristics (e.g., phase accuracy and variation requirement, gain, axial ratio, etc.) than that of the mobile device's internal satellite antenna.

In addition, and different from the mobile device's internal satellite antenna, the external antenna according to the one or more embodiments described herein may be positioned in a location (e.g., survey pole, exterior of vehicle, etc.) that is different from the mobile device and that is better suited for GNSS signal reception.

BRIEF DESCRIPTION OF THE DRAWINGS

The description below refers to the accompanying drawings, of which:

FIGS. 1A-1C depict example systems in accordance with illustrative embodiments of the present invention;

DETAILED DESCRIPTION OF AN ILLUSTRATIVE EMBODIMENT

Figure 1A:
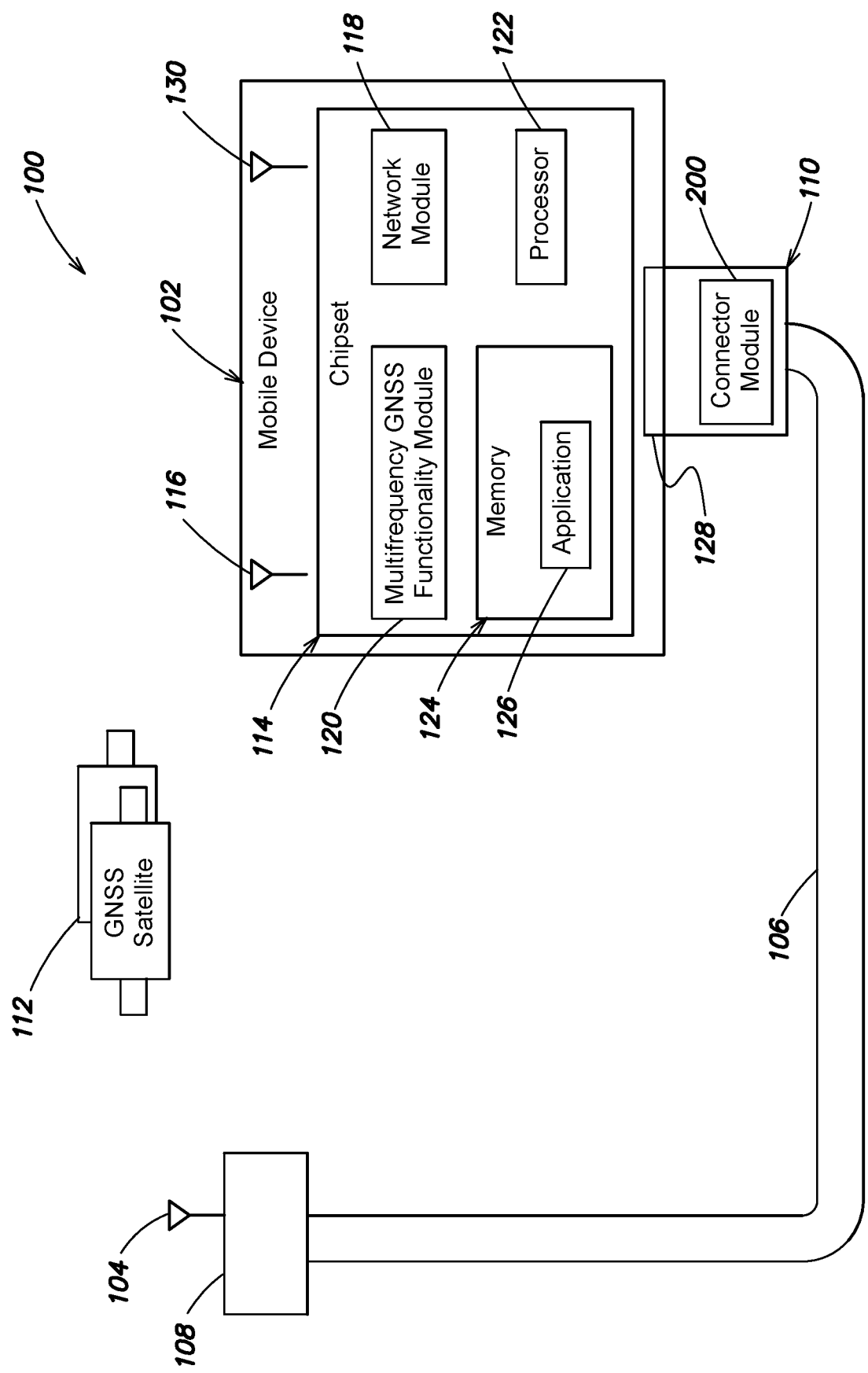
Figure 1B:
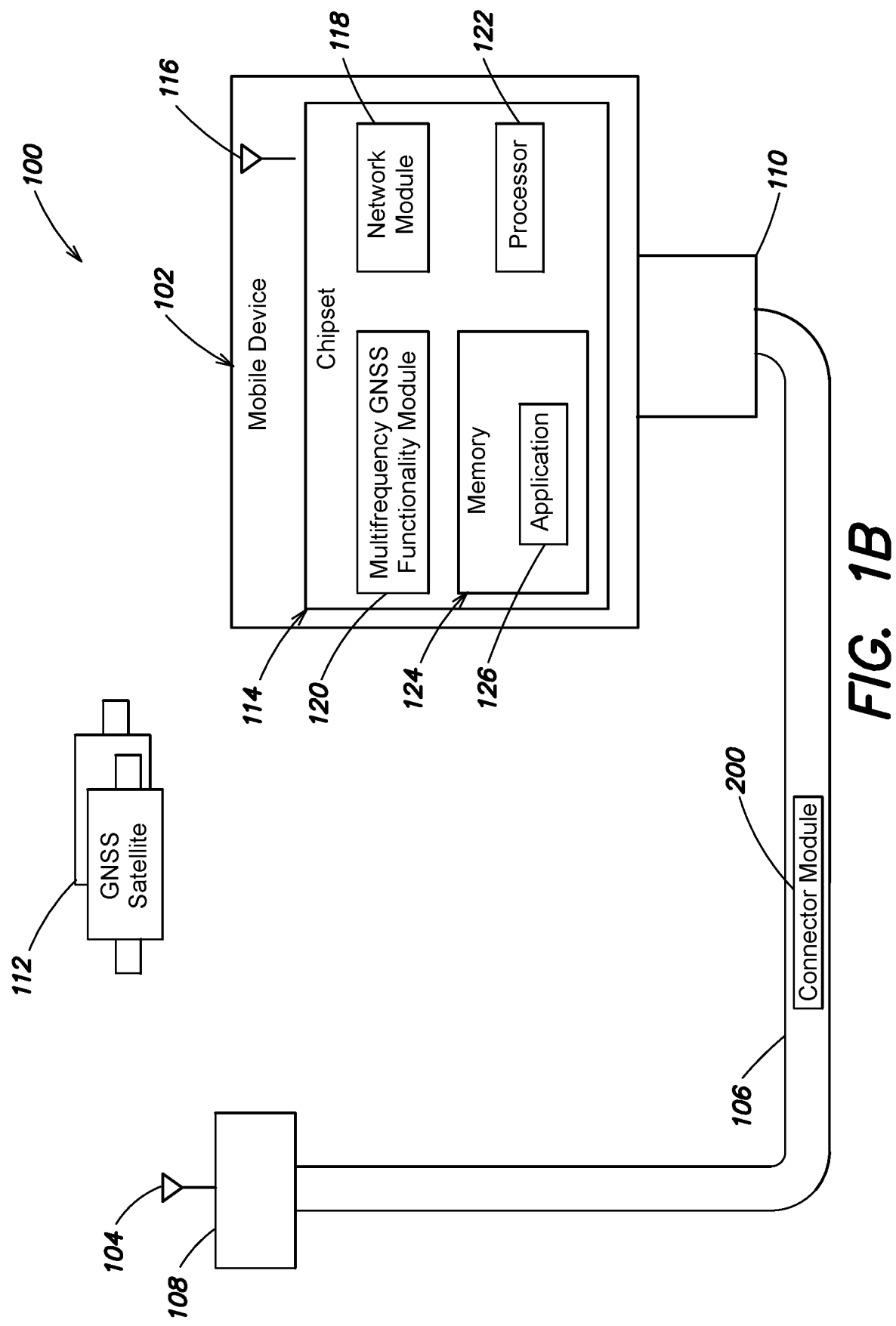

Referring to FIGS. 1A-1C, a system 100 includes a mobile device 102 and an external antenna 104 that are coupled to each other through use of a connector 106. Specifically, the connector 106, e.g., cable, may be a type that is compatible with an existing communication port 128 of the mobile device 102. For example, a first connector component 108 of the connector 106 may be coupled to the external antenna 104. In an embodiment, the first connector component may be a SubMinature version A (SMA) connector. In addition, a second connector component 110 of the connector 106 may be coupled to the existing communication port 128 of the mobile device 102. In an embodiment, the second connector component 110 is a Lightning® connector from Apple Inc., of Cupertino, Calif. In an alternative embodiment, the second connector component 110 is a Universal Serial Bus Type-C (USB-C) connector.

The external antenna 104 may be a GNSS antenna configured to receive one or more GNSS signals from one or more GNSS satellites 112. In an embodiment, the external antenna 104 may be a multifrequency GNSS antenna configured to receive GNSS signals transmitted by one or more different GNSS constellations of satellites (e.g., GPS, Galileo, QZSS, BeiDou, and/or Glonass) and over at least two different frequency bands (e.g., L1, L2, L5, E1, E5, etc.). In an alternative embodiment, the external antenna 104 may be a single frequency GNSS antenna configured to receive GNSS signals transmitted by a single GNSS constellation of satellites and over a single frequency band.

The mobile device 102 may be a smartphone, a tablet, a laptop computer, a personal computer, a smart watch, or any of a variety of different electronic devices. The mobile device 102 may include a chipset 114, a mobile device network antenna 130, and a mobile device satellite antenna 116. The mobile device network antenna 130 may be configured to received one or more wireless signals over one or more wireless networks (e.g., cellular, Bluetooth, Wi-Fi, etc.). The mobile device network antenna 130 may be configured to receive correction information from one or more external devices (e.g., rovers, base stations, servers, etc.), wherein the correction information may be utilized to implement one or more correction services. For example, such correction services may include, but are not limited to, Precise Point Positioning (PPP) and/or Real-Time Kinematics (RTK).

The mobile device satellite antenna 116 may be a single frequency or a multifrequency antenna configured to receive one or more GNSS signals from the one or more GNSS satellites 112. In addition, the mobile device satellite antenna 116 may be configured to receive the correction information from one or more external devices (e.g., rovers, base stations, servers, etc.), wherein the correction information may be utilized to implement the one or more correction services.

The chipset 114 may include a network module 118, a multifrequency GNSS functionality module 120, a processor 122, and a memory 124. The network module 118 may be configured to allow the mobile device to receive/send information over the one or more wireless networks (e.g., cellular, Bluetooth, Wi-Fi, etc.). In an embodiment, the memory 124 is non-volatile memory (e.g., flash memory, read-only memory (ROM), etc.). The memory 124 may store data, received values, and/or computed values in accordance with one or more embodiments described herein. In addition, the memory may store application 126 that may be executed by the processor 122.

The multifrequency GNSS functionality module 120 may be configured to process GNSS raw measurements, e.g., pseudorange and carrier phase measurements, obtained from GNSS signals received over at least two different frequency bands, such that errors (e.g., multipath, phase center errors, etc.) may be mitigated to compute position, velocity, and/or time (PVT) with, for example, decimeter position accuracy. In an embodiment, the multifrequency GNSS functionality module 120 may be configured to process GNSS raw measurements obtained from GNSS signals received over a single frequency band to compute PVT.

The network module 118 and multifrequency GNSS functionality module 120 is may be hardware, software, or a combination thereof. In addition, although FIGS. 1A-1C depict the network module 118, the multifrequency GNSS functionality module 120, the memory 124, and the processor 122 being separate and distinct components, it is expressly contemplated that the mobile device 102 may include one or more components that implement the functions of the network module 118, the multifrequency GNSS functionality module 120, the memory 124, and/or the processor 122.

The connector 106 includes connector module 200 that is configured to implement one or more embodiments described herein. In an embodiment, the connector module 200 is incorporated within the second connector component 110 as depicted in FIG. 1A. In alternative embodiments, the connector module 200 is incorporated in the segment of connector 106 between the first connector component 108 and the second connector component 110 as depicted in FIG. 1B, or in the first connector component 108 as depicted in FIG. 1C. Additionally, it is expressly contemplated that portions of the connector module 200 may be split between one or more of the first connector component 108, the second connector component 110, and the segment between the first connector component 108 and the second connector component 110. For example, a first portion of the connector module 200 may be located within the segment between the first connector component 108 and the second connector component 110, and a second portion of the connector module 200 may be located in the second connector component 110.

Figure 2A:
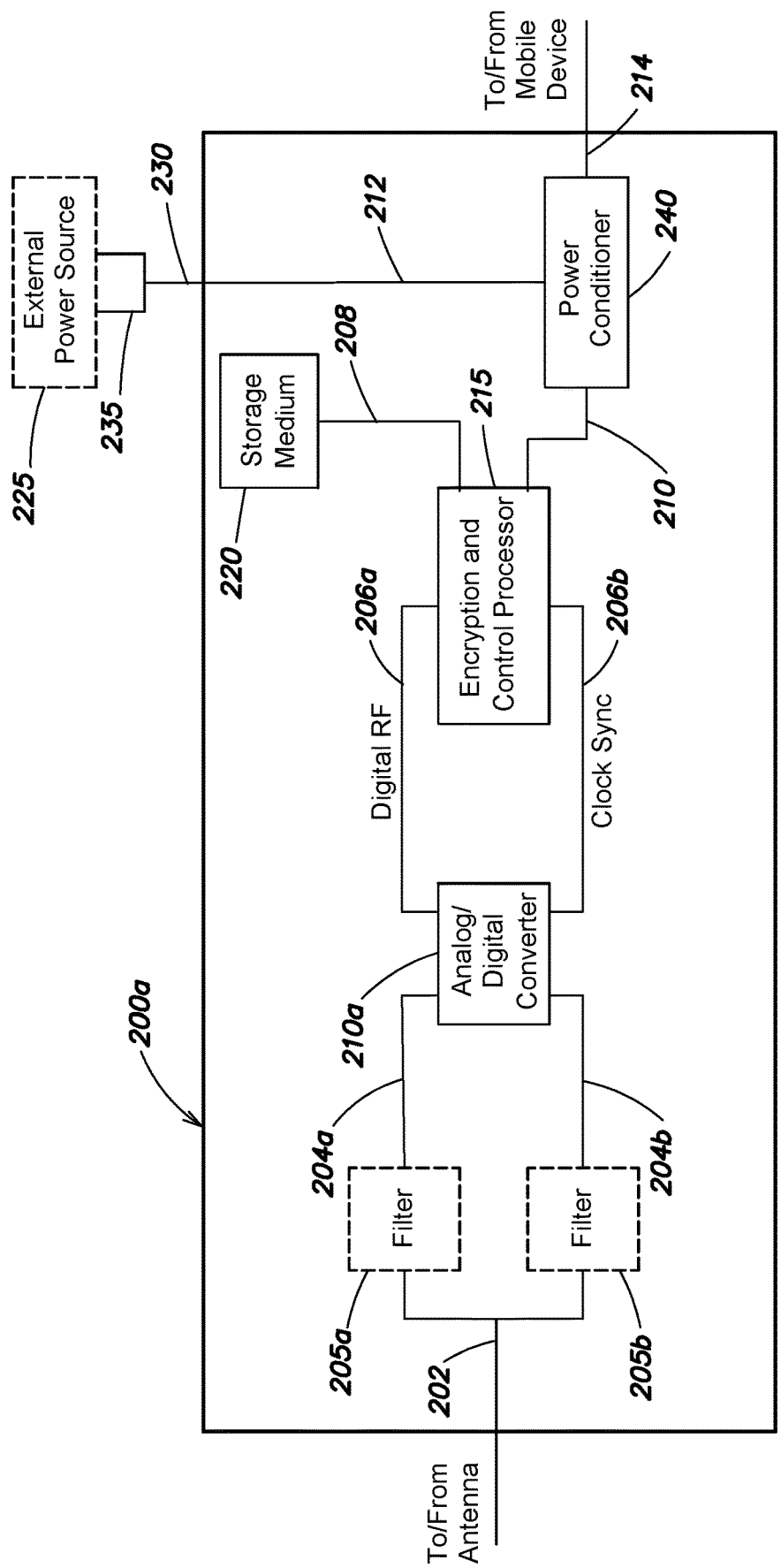
FIGS. 2A and 2B depict example connector modules in accordance with illustrative embodiments of the present invention.

FIG. 2A depicts an example connector module 200a in accordance with an illustrative embodiment of the present invention. The connector module 200a may include one or more components that are connected to each other utilizing one or more is connections as depicted in FIG. 2A. For example, the connections may be wires, buses, an integrated circuit (IC), etc. In an embodiment, the connector module 200a may include one or more filters, e.g., 205a and 205b, that receive, via connection 202, the GNSS signals received at the external antenna 104 that may, for example, be in analog format. Since the filters 205a and 205b are optional, they are designated with dashed lines in FIG. 2A. In this example, let it be assumed that the GNSS signals received at the external antenna 104 include GNSS signals received from at least the GPS constellation of satellites and over the L1 and L2 frequency bands. Filters 205a and 205b may respectively perform signal processing functions on the GNSS signals received over the L1 and L2 frequency bands to remove unwanted signal components (e.g., noise, etc.). The removal of unwanted signal components from a received signal may be known as "out-of-band rejection."

For example, filter 205a may be a band pass filter that operates at 1567.5+/−42.5 MHz to remove unwanted noise/signals that are outside the L1 frequency band (1575.42 MHz), such that only the signals of interest, e.g., L1 frequency band signals, are captured. Filter 205a may operate at other frequencies ranges to remove unwanted noise/signals such that other signals of interest are captured. The following table provides example frequencies ranges that filter 205a may operate at to remove unwanted noise/signals such that particular signals of interest are captured.

| Operating Frequency Range | Signals of Interest |
| --- | --- |
| 1580 +/− 30 MHz | All BeiDou to all Glonass signals |
| 1587.5 +/− 22.5 MHz | All GPS, Galileo, and Glonass signals with partial capture of BeiDou signals (e.g., GPS L1CA/L1C, Galileo E1C, BeiDou B1C, and Glonass L1CA/L1OC/L1OCI) |
| 1568 +/− 17 MHz | All BeiDou, GPS, and Galileo signals, with partial capture of Glonass signals (e.g., GPS L1CA/L1C, Galileo E1C, BeiDou B1I/B1C, and Glonass L1OCI) |
| 1575 +/− 10 MHz | All GPS and Galileo signals with partial capture of BeiDou and Glonass signals (e.g., GPS L1CA/L1C, Galileo E1C, BeiDou B1C, and Glonass L1OCI) |

Similarly, filter 205b may be a band pass filter that operates at 1210.0+/−44.0 MHz to remove unwanted noise/signals that are outside the L2 frequency band (1227.60 MHz), such that only the signals of interest, e.g., L2 frequency band signals, are captured. Filter 205b may operate at other frequencies ranges to remove unwanted noise/signals such that other signals of interest are captured. The following table provides example frequencies ranges that filter 205a may operate at to remove unwanted noise/signals such that particular signals of interest are captured.

| Operating Frequency Range | Signals of Interest |
| --- | --- |
| 1271 +/− 13 MHz | Galileo E6, BeiDou B3, and QZSS LEX signals. |
| 1236 +/− 20 MHz | GPS L2 and Glonass L2 signals. |
| 1192 +/− 25 MHz | GPS/QZSS L5, GLO L5OCI/L3OCI, GAL E5A/B/ALTBOC, BeiDou B2I, B2A/B and IRNSS |

Although the example describes filters 205a and 205b operating for the L1 and L2 frequency bands, it is expressly contemplated that filters 205a and 205b may operate for different frequency bands (e.g., E5A/B and B3/E6). In addition or alternatively, the one or more embodiments described herein may use additional and/or other filters for additional and/or other frequency bands of interest, e.g., E5A/B, B3/E6, etc.

In this example, the GNSS signals, in analog format and filtered for the L1 and L2 frequency bands respectively by filter 205a and 205b, may be transmitted from the filters 205a and 205b to the analog/digital converter 210a via connections 204a and 204b. The analog/digital converter 210a may convert the filtered GNSS signals into a digital format to generate digital radio frequency (RF) signals. For example, the analog/digital converter 210a may convert the filtered GNSS signals for the L1 frequency band to generate one or more first digital RF signals. In addition, the analog/digital converter 210a may convert the filtered GNSS signals for the L2 frequency band to generate one or more second digital RF signals. The analog/digital converter 210a may convert the filtered GNSS signals received from filters 205a and 205b in series and/or in parallel. In an embodiment and where filters 205a and 205b are not included in connector module 200a, the GNSS signals, in analog format and received at the external antenna 104, may is be transmitted to analog/digital converter 210a that may include frequency filtering functionality and may convert the GNSS signals to one or more digital RF signals for selected frequency bands, e.g., L1 and L2.

The one or more digital RF signals may be transmitted, via connection 206a, from the analog/digital converter 210a to the encryption and control processor 215 of the connector module 200a. In this example, the one or more first digital RF signals for the L1 frequency band and the one or more second digital RF signals for the L2 frequency band are transmitted, e.g., as indicated by "Digital RF" via connection 206a, from the analog/digital converter 210a to the encryption and control processor 215. For example, the one or more first digital RF signals and the one or more second digital RF signals may be transmitted in series from the analog/digital converter 210a to the encryption and control processor 215. The encryption and control processor 215 may encrypt the one or more digital RF signals to generate one or more encrypted digital RF signals. For example, the encryption and control processor 215 may receive one or more encryption keys stored in storage medium 220 via connection 208. The encryption and control processor 215 may encrypt the digital RF signals utilizing the one or more encryption keys to generate the one or more encrypted digital RF signals. For example, such encryption keys may be associated with one or more encryption algorithms such as, but not limited to, Advanced Encryption Standard (AES)-256.

In addition to encrypting the one or more digital RF signals, the encryption and control processor 215 may implement a clock synchronization process, as indicated by "clock sync" over connection 206b, with the analog/digital converter 210a such that the conversion process implemented by the analog/digital converter 210a and the encryption is process implemented by the encryption and control processor 215 are coordinated. Alternatively, a different clock synchronization process may be implemented or the analog/digital converter 210a and the encryption and control processor 215 may share a common clock (not shown).

In addition to storing the encryption keys, the storage medium 220 may store other information such as, but not limited to, buffering information that may be utilized by the encryption and control processor 215 to buffer/queue the one or more encrypted digital RF signals at the encryption and control processor 215 prior to being transmitted to the mobile device 102.

Power to the analog/digital converter 210a, the encryption and control processor 215, and/or the external antenna 104 may be provided by the external power source 225 and/or the mobile device 102 via the power conditioner 240. The external power source 225 may for example, be a battery (e.g., lithium battery, battery of a vehicle) or some other type of power source. In addition, the external power source 225 may be coupled to the connector module 200a via an additional segment 230 of the connector 106 and an additional connector component 235. Specifically, the additional connector component 235 may be connected to an existing port of the external power source 225 such that power from the external power source 225 may be provided via the additional segment 230 and connections 212 and 210 to the components (e.g., analog/digital converter 210a and/or the encryption and control processor 215) of the control module 200a and/or the external antenna 104. Since the external power source 225 is optional, it is designated with dashed lines in FIG. 2A.

When the external power source 225 is not connected to the additional connector is component 235, power to the analog/digital converter 210a, the encryption and control processor 215, and/or the external antenna 104 may be provided by the mobile device 102 via connections 214 and 210. When the external power source 225 is connected to the additional connector component 235, power to the analog/digital converter 210a, the encryption and control processor 215, and/or the external antenna 104 may be provided by the external power source 225, the mobile device 102, or by both the external power source 225 and the mobile device 102.

Power, from the external power source 225 and/or the mobile device 102, may be provided to the components of the connector module 200a and the external antenna 104 via the power conditioner 240. The power conditioner 240, as known by those skilled in the art, may act as a buffer between the power source (e.g., the external power source 225 and/or the mobile device 102) and the downstream devices (e.g., components of the connector module 225 and the external antenna 104) by smoothing out voltage fluctuations as well as radio and/or electromagnet interferences that can affect the operation and performance of the downstream devices. As such, power from the external power source 225 and/or the mobile device 102 may be provided via the power conditioner 240 and to the encryption and control processor 215 and analog/digital converter via the connections in the control module 200a. In addition, power from the external power source 225 and/or the mobile device 102 may be provide via the power conditioner 240 to the external antenna 104 via the connections in the control module 200a, and then the connector 106 and/or the first connector component 108.

Figure 2B:
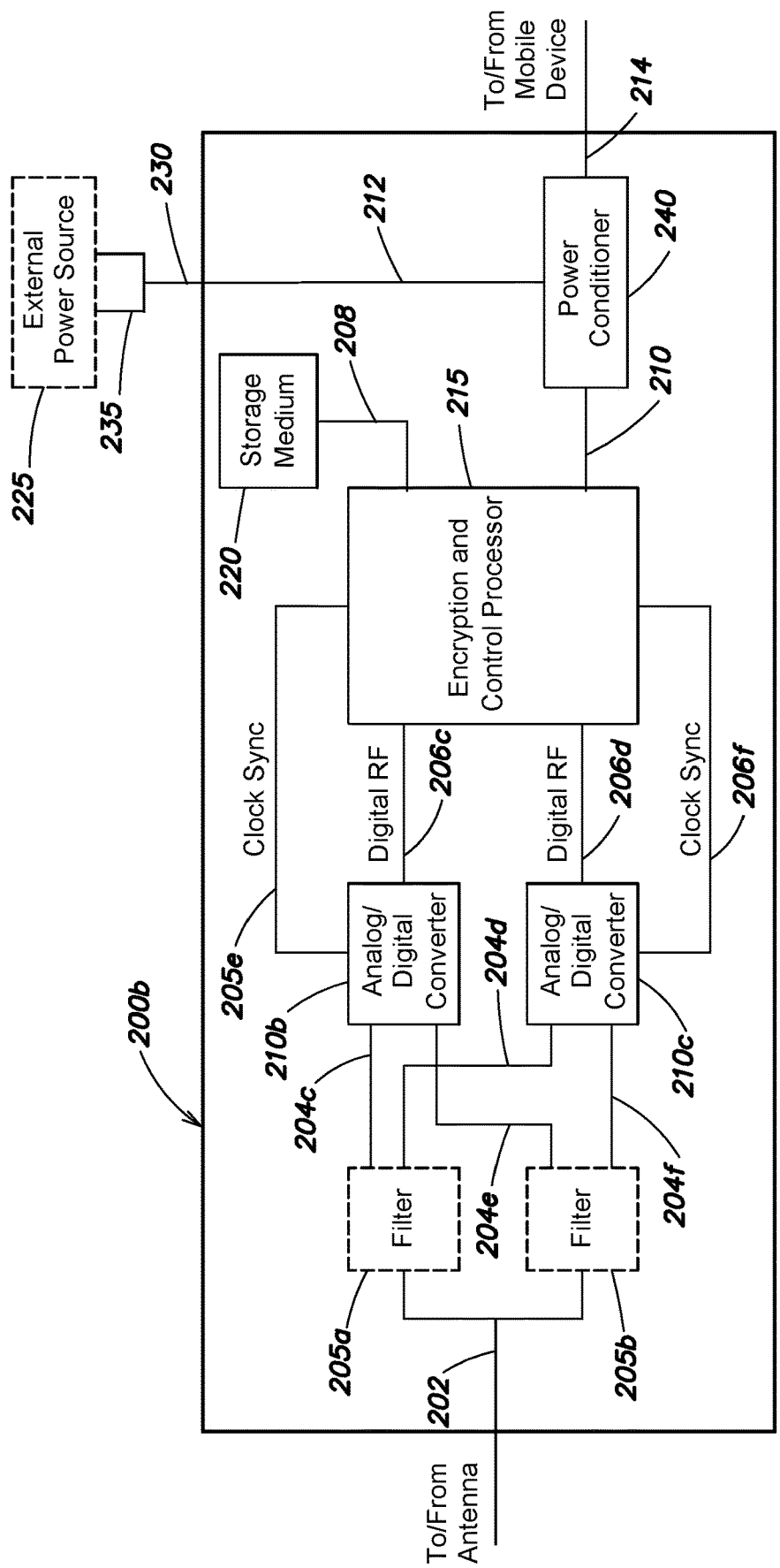

FIG. 2B depicts an example connector module 200b in accordance with an illustrative embodiment of the present invention. Similar to FIG. 2A, the connector is module 200 includes filters 205a and 205b (optional), the encryption and control processor 215, storage medium 220, external power source 225 (optional), power conditioner 240, and connections that may operate in a similar manner as described above with respect to FIG. 2A.

In the example with reference to FIG. 2B, let it be assumed that the GNSS signals received at the external antenna 104 include GNSS signals received from at least the GPS constellation of satellites over the L1, L2, and L5 frequency bands. In this example, filter 205a may perform signal processing functions on the received GNSS signals over the L1 frequency band in order to remove unwanted signal components (e.g., noise, etc.) such that only the signals of interest, e.g., L1 frequency band signals, are captured. For example, filter 205a may be a band pass filter that operates at 1567.5+/−42.5 MHz for the L1 frequency band (1575.42 MHz).

In addition, filter 205b may perform signal processing functions on the received GNSS signals over the L2 and L5 frequency bands in order to remove unwanted signal components (e.g., noise, etc.) such that only the signals of interest, e.g., L2 and L5 frequency band signals, are captured. For example, filter 205b may be a band pass filter that operates at 1210.0+/−44.0 MHz for the L2 frequency band (1227.60 MHz) and at 1166.5+/−44.0 MHz for the L5 frequency band (1176.45 MHz). That is, the filter 205b may frequency hop between a plurality of different frequency bands, e.g., L2 and L5 frequency bands, such that additional frequency bands may be utilized according to the one or more embodiments described herein.

In this example, the filtered GNSS signals for the L1 frequency band and from filter 205a may be transmitted to analog/digital converter 210b via connection 204c. In addition, the filtered GNSS signals for the L2 frequency band and from filter 205b may be transmitted to analog/digital converter 210b via connection 204e. Analog/digital converter 210b may operate in a similar manner as described above with reference to FIG. 2A to generate one or more first digital RF signals and the one or more second digital RF signals for the L1 and L2 frequency bands.

In addition, the filtered GNSS signals for the L5 frequency band from filter 205b may be transmitted to analog/digital converter 210c via connection 204f. Analog/digital converter 210c may operate in a similar manner as described above with reference to FIG. 2A to generate one or more third digital RF signals for the L5 frequency band.

Advantageously, and according to this example, an additional channel is utilized for the additional L5 frequency band. Although connection 204d is not utilized in this example, it is expressly contemplated that connection 204d may be utilized for an additional frequency band of interest, e.g., E6, according to one or more embodiments described herein. For example, filter 205a may frequency hop between the L1 and E6 frequency bands and transmit the filtered GNSS signals for the E6 frequency band to analog/digital converter 210c, via connection 204d, to generate fourth digital RF signals for the E6 frequency band.

The encryption and control processor 215 may receive the digital RF signals from analog/digital converters 210b and 210c via connections 206c and 206d and operate in a similar manner as described above with reference to FIG. 2A to encrypt the one or more first digital RF signals, the one or more second digital RF signals, and one or more third digital RF signals to generate the one or more encrypted digital RF signals.

Referring back to FIGS. 1A-1C, the one or more encrypted digital RF signals are is transmitted from the connector module 200 to the mobile device 102. The one or more encrypted digital RF signals may be stored in the memory 124 of the chipset 114 of the mobile device 102. The application 126, executed by the processor 122 of the chipset 114, may decrypt the one or more encrypted digital RF signals to generate one or more decrypted digital RF signals. For example, the application 126 may be downloaded onto the mobile device 102. A user may perform one or more registration processes by providing particular information (e.g., name, date of birth, serial number of antenna, serial number of connector, etc.) to initialize the connector 106, the external 104, and/or mobile device 102 such that they may operate with one another. After or during the initialization process, one or more decryption keys may be provided to the mobile device 102 and stored in memory 124. Specifically, the one or more decryption keys may correspond to the encryption keys stored in storage medium 220 of the connector module 200*a* such that only the application 126 executing on mobile device 102 has the capability to decrypt the encrypted digital RF signals received form the connector module 200*a*.

For example, the application 126 may receive the one or more decryption keys from the storage medium 220 of the connector module 200 such that the one or more decryption keys may be stored in memory 124 of the mobile device 102. In addition or alternatively, the one or more decryption keys may be provided to the mobile device 102 via a particular frequency, e.g., L-band or wireless network from an external server and/or a different device such that the one or more decryption keys may be stored in the memory 124. The one or more encrypted digital RF signals may be decrypted utilizing the one or more decryption keys to generate the one or more decrypted digital RF signals. For example, and with reference to FIG. 2B, the one or more decrypted digital RF signals may correspond to the GNSS signals in digital format received over the L1, L2, and L5 frequency bands.

The multifrequency GNSS functionality module 120 of the chipset 114 may utilize the one or more decrypted digital RF signals to obtain GNSS raw measurements. For example, and with reference to FIG. 2B, the GNSS raw measurements may be pseudorange and/or carrier phase measurements obtained based on the one or more decrypted digital RF signals for the L1, L2, and L5 frequency bands. In an embodiment, the multifrequency GNSS functionality module 120 may utilize the GNSS raw measurements, which may be associated with at least two different frequency bands (e.g., L1, L2, and L5), to compute PVT. The PVT may be provided to the application 126, and the application 126 may display the PVT on a display device (not shown) of the mobile device 102.

In an alternative embodiment, the application 126 may receive the GNSS raw measurements from the multifrequency GNSS functionality module 120, and the application 126 may compute PVT and display the PVT on a display device (not shown) of the mobile device. In addition or alternatively, the PVT may be displayed on a display device that is coupled to and/or in communication with the mobile device 102, e.g., an audio/video system of a vehicle.

Further, the application 126 may obtain encrypted correction information via a particular frequency, e.g., L-band, and based on signals received at the mobile device satellite antenna 116. In addition or alternatively, the application 126 may obtain the encrypted correction information via a wireless network such as, but not limited to, a cellular network, a Bluetooth network, and/or a Wi-Fi network. For example, the mobile is device 102 may have wireless network communication capability through use of the network module 118. As such, the application 126 may receive the encrypted correction information via the wireless network and based on signals received at the mobile device network antenna 130.

The application may then decrypt the encrypted correction information utilizing one or more decryption keys that may, for example, be stored in memory 124. The application may utilize the decrypted correction information to implement one or more correction services to compute the PVT with higher accuracy and reduced convergence time, e.g., higher accuracy and reduced convergence time as compared to PVT that may be computed utilizing only the GNSS raw measurements. For example, the correction service may be, RTK, PPP, or a different correction service.

Figure 3:
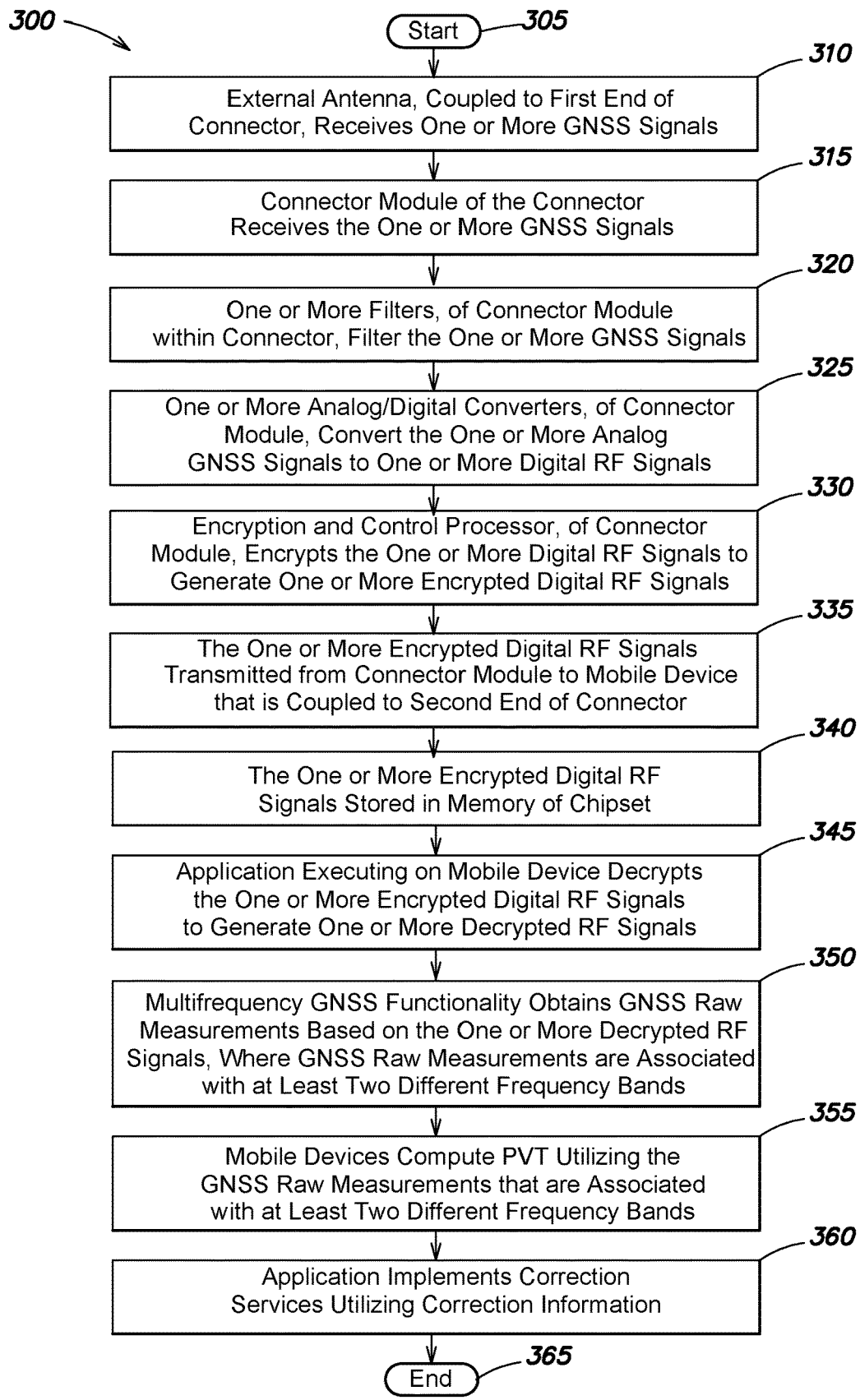
FIG. 3 is a flow diagram of a sequence of steps for utilizing a connector with an external antenna to utilize multifrequency GNSS functionality of a mobile device in accordance with an illustrative embodiment of the present invention.

FIG. 3 is a flow diagram of a sequence of steps for utilizing a connector with an external antenna to utilize multifrequency GNSS functionality of the mobile device in accordance with an illustrative embodiment of the present invention. The procedure 300 starts at step 305 and continues to step 310 where an external antenna, e.g., GNSS antenna, coupled to a first end of a connector, receives one or more GNSS signals. For example, a first connector component 108 at a first end of a connector 106, e.g., cable, may be coupled to an external antenna 104. In an embodiment, the external antenna 104 may be a multifrequency GNSS antenna configured to receive GNSS signals transmitted by one or more different GNSS constellations of satellites (e.g., GPS, Galileo, QZSS, BeiDou, and/or Glonass) and over at least two different frequency bands (e.g., L1, L2, L5, E1, E5, etc.). In an alternative embodiment, the external antenna 104 may be a single frequency GNSS antenna configured to receive GNSS signals transmitted by a single GNSS constellation of satellites and over a single frequency band.

The procedure continues to step 315 and a connector module of the connector 106 receives the one or more GNSS signals. In an embodiment, the connector module 200 is incorporated within the second connector component 110 as depicted in FIG. 1A. In alternative embodiments, the connector module 200 is incorporated in the segment of connector 106 between the first connector component 108 and the second connector component 110 as depicted in FIG. 1B, or in the first connector component 108 as depicted in FIG. 1C.

Optionally, the procedure continues to step 320 and one or more filters, of the connector module 200 within the connector 106, filter the GNSS signals. For example, and as with reference to FIG. 2A, filters 205*a* and 205*b* may respectively perform signal processing functions on the received GNSS signals over the L1 and L2 frequency bands to remove unwanted signal components (e.g., noise, etc.).

The procedure continues to step 325 and one or more analog/digital converters, of the connector module 200 within the connector 106, convert the one or more filtered GNSS signals to generate one or more digital RF signals. The procedure continues to step 330 and encryption and control processor, of the connector module 200 within the connector 106, encrypts the one or more digital RF signals to generate one or more encrypted digital RF signals. For example, the encryption and control processor 215 may encrypt the one or more digital RF signals utilizing one or more encryption keys stored in storage medium 220. Power, from the external power source 225 and/or the mobile device 102, may be provided to the components of the connector module 200a and/or the external antenna 104 via the power conditioner 240.

The procedure continues to step 335 and the one or more encrypted digital RF signals are transmitted from connector module 200 to a mobile device 102 that is coupled to a second end of the connector 106. For example, the second connector component 110 of the connector 106 may be coupled to the existing communication port 128 of the mobile device 102. The procedure continues to step 340 and the one or more encrypted digital RF signals are stored in memory 124. The procedure continues to step 345 and the application 126, executing on mobile device 102, decrypts the one or more encrypted digital RF signals to generate one or more decrypted digital RF signals. For example, the application 126 may utilize one or more decryptions keys stored in memory 124 to decrypt the one or more encrypted digital RF signals to generate the one or more decrypted digital RF signals.

The procedure continues to step 350 and the multifrequency GNSS functionality 120 obtains GNSS raw measurements based on the one or more decrypted digital RF signals, where the GNSS raw measurements are associated with at least two different frequency bands. For example, and with reference to FIG. 2A, the GNSS raw measurements may be pseudorange and/or carrier phase measurements obtained based on the one or more decrypted RF signals for the L1 and L2 frequency bands.

The procedure continues to step 355 and the mobile device 102 computes PVT utilizing the GNSS raw measurements that are associated with at least two different frequency bands. In an embodiment, the multifrequency GNSS 120 functionality module may utilize the GNSS raw measurement, which may be associated with two different frequency bands (e.g., L1 and L2), to compute PVT. The PVT may be provided to the is application 126, and the application 126 may display the PVT on a display device (not shown) of the mobile device 102. In an alternative embodiment, the application 126 may receive the GNSS raw measurements from the multifrequency GNSS functionality module 120, and the application 126 may compute PVT and display the PVT on a display device (not shown) of the mobile device. In addition or alternatively, the PVT may be displayed on a display device that is coupled to and/or in communication with the mobile device 102, e.g., an audio/video system of a vehicle.

Advantageously, a variety of different and generic external antennas may be coupled to a mobile device utilizing the connector including the connector module to leverage the existing internal multifrequency GNSS functionality of the mobile device to mitigate errors (e.g., multipath, phase center errors, and other errors) such that PVT with decimeter position accuracy, for example, may be computed. As such, the one or more embodiments described herein do not require a specific type of antenna as is required by some conventional systems. Additionally, in contrast to some conventional systems, the one or more embodiments described herein do not require the execution of a software defined radio to utilize the multifrequency GNSS functionality of the mobile device, which may be burdensome on the mobile device's battery power.

Utilizing the external antenna 104 to leverage the existing internal multifrequency GNSS functionality 120 according to the one or more embodiments described herein also has advantages over utilizing the mobile device's internal satellite antenna 116. Specifically, the external antenna 104 according to the one or more embodiments described herein is not restricted by the form factor (e.g., user design, size, etc.) of the mobile device 102. The form factor of the mobile device 102 may, for example, limit the is operating characteristics of the mobile device's internal satellite antenna 116. As such, the external antenna 104 according to the one or more embodiments described herein may implement operating characteristics not available to and/or not implemented by the mobile device's internal satellite antenna 116. For example, such operating characteristics may include, but are not limited to, multipath mitigation techniques, anti-jamming techniques, etc. In addition, because the external antenna 104 is not limited by the form factor of the mobile device 102, the external antenna 104 may exhibit better performance characteristics (e.g., phase accuracy and variation requirement, gain, axial ratio, etc.) than that of the mobile device's internal satellite antenna 116.

In addition, and different from the mobile device's internal satellite antenna 116, the external antenna 104 according to the one or more embodiments described herein may be positioned in a location (e.g., survey pole, exterior of vehicle, etc.) that is different from the mobile device 102 and that is better suited for GNSS signal reception.

Optionally, the procedure continues to step 360 and the application 126 implements a correction service utilizing correction information. For example, the application 126 may receive encrypted correction information via a particular frequency, e.g., L-band, or via a wireless network, e.g., cellular, Bluetooth, Wi-Fi, etc. The application 126 may decrypt the encrypted correction information and utilize the decrypted correction information to implement a correction service, e.g., RTK and/or PPP, to compute the PVT with higher accuracy and reduced convergence time, e.g., higher accuracy and reduced convergence time as compared to PVT that may be computed utilizing only the GNSS raw measurements. The procedure ends at step 365.

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A system, comprising:
an antenna configured to receive one or more Global Navigation Satellite System (GNSS) signals;
a connector cable having a first end with a first connector component and a second end with a second connector component, wherein the first connector component is coupled to the antenna and the second connector component is coupled to a mobile device;
a connector module of the connector cable, wherein the connector module is located within the first connector component, the second connector component, or the connector cable, and wherein the connector module is configured to:
convert the one or more GNSS signals to generate one or more digital radio frequency (RF) signals,
encrypt the one or more digital RF signals to generate one or more encrypted digital RF signals, and
transmit the one or more encrypted digital RF signals to the mobile device coupled to the second connector component; and the mobile device configured to utilize information from the one or more encrypted digital RF signal to compute at least one of position, velocity, or time.

2. The system of claim 1, wherein the mobile device includes an application configured to decrypt the one or more encrypted digital RF signals to generate one or more decrypted digital RF signals.

3. They system of claim 2, wherein the mobile device is a multifrequency functionality mobile device and the information is GNSS raw measurements that are associated with at least two different frequency bands.

4. The system of claim 3, wherein mobile device is further configured to compute the at least one of position, velocity, or time utilizing the GNSS raw measurements.

5. The system of claim 3, wherein the application is further configured to compute the at least one of position, velocity, or time utilizing the GNSS raw measurements.

6. The system of claim 5, wherein the application is further configured to:
receive correction information, and
utilize the correction information with the GNSS raw measurements to implement a correction service to compute the at least one of the position, velocity, or time.

7. The system of claim 6, wherein the correction service is associated with real-time kinematic (RTK) positioning or precise point positioning (PPP).

8. A method, comprising:
receiving, at an antenna, one or more Global Navigation Satellite System (GNSS) signals, wherein the antenna is coupled to a first end of a connector cable utilizing a first connector component;
converting, by a connector module of the connector cable, the one or more GNSS signals to one or more digital radio frequency (RF) signals, wherein the connector module is located within the first connector component, the connector cable, or a second connector component at a second end of the connector cable;
encrypting, by the connector module, the one or more digital RF signals to generate one or more encrypted digital RF signals; and
transmitting, by the connector module, the one or more encrypted digital RF signals to a mobile device coupled to the second end of the connector cable utilizing the second connector component.

9. The method of claim 8, further comprising decrypting, by an application executing on the mobile device, the one or more encrypted digital RF signals to generate one or more decrypted digital RF signals.

10. The method of claim 9, wherein the mobile device is a multifrequency functionality mobile device, the method further comprising obtaining, by the mobile device, GNSS raw measurements from the one or more decrypted digital RF signals, wherein the GNSS raw measurements are associated with at least two different frequency bands.

11. The method of claim 10, further comprising computing, by the mobile device, at least one of position, velocity, or time utilizing the GNSS raw measurements.

12. The method of claim 10, further comprising computing, by the application, at least one of position, velocity, or time utilizing the GNSS raw measurements.

13. The method of claim 12, further comprising:
receiving, by the application, correction information, and
utilizing, by the application, the correction information with the GNSS raw measurements to implement a correction service to compute the at least one of the position, velocity, or time.

14. The method of claim 13, wherein the correction service is associated with real-time kinematic (RTK) positioning or precise point positioning (PPP).

15. A system, comprising:
an antenna configured to receive one or more Global Navigation Satellite System (GNSS) signals over at least two different frequency bands;
a connector cable having a first end with a first connector component and a second end with a second connector component, wherein the first connector component is coupled to the antenna and the second connector component is coupled to a mobile device;
a connector module of the connector cable, wherein the connector module is located within the first connector component, the second connector component, or the connector cable, and wherein the connector module is configured to:
convert the one or more received GNSS signals to one or more digital radio frequency (RF) signals,
encrypt the one or more digital RF signals to generate one or more encrypted digital RF signals, and
transmit the one or more encrypted digital RF signals to the mobile device coupled to the second connector component;
the mobile device configured to:
receive the one or more encrypted digital RF signals,
decrypt the one or more encrypted digital RF signals to generate one or more decrypted digital RF signals,
obtain raw measurements from the one or more decrypted digital RF signals, wherein the raw measurements are associated with the at least two different frequency bands, and
compute at least one of position, velocity, and time utilizing the raw measurement.

16. The system of claim 15, further comprising an application executing on the mobile device, wherein the application is configured to:
receive correction information, and
utilize the correction information with the GNSS raw measurements to implement a correction service to compute the at least one of the position, velocity, or time.

17. The system of claim 16, wherein the correction service is associated with real-time kinematic (RTK) positioning or precise point positioning (PPP).

18. The system of claim 1, wherein the connector module is located within one or more of the first connector component, the second connector component, or the connector cable.

19. The method of claim 8, wherein the connector module is located within one or more of the first connector component, the second connector component, or the connector cable.

20. The system of claim 15, wherein the connector module is located within one or more of the first connector component, the second connector component, or the connector cable.

21. A connector cable, comprising:
a first end with a first connector component that is coupled to an antenna;
a second end with a second connector component that is coupled to a mobile device;
a connector module that is located within the first connector component, the second connector component, or the connector cable, wherein the connector module is configured to:

convert one or more Global Navigation Satellite System (GNSS) signals, received at the antenna, to generate one or more digital radio frequency (RF) signals, encrypt the one or more digital RF signals to generate one or more encrypted digital RF signals, and transmit the one or more encrypted digital RF signals to the mobile device coupled to the second connector component.

* * * * *

UNITED STATES PATENT AND TRADEMARK OFFICE
CERTIFICATE OF CORRECTION

PATENT NO. : 11,614,545 B2
APPLICATION NO. : 16/830653
DATED : March 28, 2023
INVENTOR(S) : Miguel Amor et al.

It is certified that error appears in the above-identified patent and that said Letters Patent is hereby corrected as shown below:

In the Specification

Column 1, Line 54: Should read:
"of the mobile device. For example, a connector, e.g., a"

Column 4, Line 49: Should read:
"tionality module 120 may be hardware, software, or a"

Column 5, Line 16: Should read:
"one or more connections as depicted in FIG. 2A. For"

Column 6 Line 39: Should read:
"received at the external antenna 104, may is be transmitted"

Column 7, Line 7: Should read:
"tion process implemented by the encryption and control"

Column 7, Line 39: Should read:
"the additional connector component 235, power to the"

Column 9, Line 6: Should read:
"encrypted digital RF signals are transmitted from the"

Column 10, Line 5: Should read:
"example, the mobile device 102 may have wireless"

Column 11, Line 38: Should read:
"may be provided to the application 126, and the applica-"

Signed and Sealed this
Twentieth Day of August, 2024

Katherine Kelly Vidal
*Director of the United States Patent and Trademark Office*

Column 12, Line 5: Should read:
"device 102 may, for example, limit the operating charac-"